US011676392B2

(12) United States Patent
Montemerlo (10) Patent No.: US 11,676,392 B2
(45) Date of Patent: Jun. 13, 2023

(54) LOCALIZATION USING SURFEL DATA

(71) Applicant: Waymo LLC, Mountain View, CA (US)

(72) Inventor: Michael Montemerlo, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 243 days.

(21) Appl. No.: 16/892,186

(22) Filed: Jun. 3, 2020

(65) Prior Publication Data

US 2021/0381843 A1 Dec. 9, 2021

(51) Int. Cl.
| | | |
|---|---|---|
| G01C 21/36 | (2006.01) | |
| G05D 1/02 | (2020.01) | |
| G06K 9/00 | (2022.01) | |
| G06K 9/62 | (2022.01) | |
| G06V 20/56 | (2022.01) | |
| G06V 20/64 | (2022.01) | |
| G06F 18/2431 | (2023.01) | |

(52) U.S. Cl.
CPC ....... *G01C 21/3602* (2013.01); *G05D 1/0285* (2013.01); *G06F 18/2431* (2023.01); *G06V 20/56* (2022.01); *G06V 20/653* (2022.01)

(58) Field of Classification Search
CPC .............. G01C 21/3602; G01C 21/005; G01C 21/3807; G01C 21/3833; G05D 1/0285; G06K 9/628; G06V 20/56; G06V 20/653; G06V 10/84
See application file for complete search history.

(56) References Cited

U.S. PATENT DOCUMENTS 10,436,595 B2 * 10/2019 Wang ............... G01S 17/89
10,838,065 B2 * 11/2020 Olson ............... G01S 17/42
(Continued)

FOREIGN PATENT DOCUMENTS

JP 7009399 B2 * 1/2022

OTHER PUBLICATIONS

Chen et al., SuMa++: Efficient LiDAR-based Semantic SLAM, published in 2019 IEEE/RSJ International Conference on Intelligent Robots and Systems (IROS); pp. 4530-4537 (Year: 2019).*

(Continued)

*Primary Examiner* — Anne Marie Antonucci
*Assistant Examiner* — Connor L Knight
(74) *Attorney, Agent, or Firm* — Fish & Richardson P.C.

(57) ABSTRACT

Methods, systems, and apparatus, including computer programs encoded on computer storage media, for using surfels for vehicle localization. One of the methods includes obtaining surfel data comprising a plurality of surfels, wherein each surfel corresponds to a respective different location in an environment, and each surfel has associated data that comprises a stability measure, wherein the stability measure characterizes a permanence of a surface represented by the surfel; obtaining sensor data for a plurality of locations in the environment, the sensor data having been captured by one or more sensors of a first vehicle; determining a plurality of high-stability surfels from the plurality of surfels in the surfel data; and determining a location in the environment of the first vehicle using the plurality of selected high-stability surfels and the sensor data.

17 Claims, 4 Drawing Sheets

(56) References Cited

U.S. PATENT DOCUMENTS

| | | | | |
|---|---|---|---|---|
| 11,227,401 | B1* | 1/2022 | Mahieu | G06T 17/005 |
| 2009/0278672 | A1* | 11/2009 | Weilkes | G08G 1/166 |
| | | | | 340/435 |
| 2014/0320653 | A1* | 10/2014 | Bourgeois | G06T 7/73 |
| | | | | 348/148 |
| 2019/0026943 | A1* | 1/2019 | Yan | G06T 7/586 |
| 2019/0147220 | A1* | 5/2019 | Mccormac | G06V 20/41 |
| | | | | 382/103 |
| 2020/0003901 | A1* | 1/2020 | Shroff | G01S 17/931 |
| 2020/0137351 | A1* | 4/2020 | Bai | G05D 1/0246 |
| 2020/0200905 | A1 | 6/2020 | Lee et al. | |
| 2021/0063200 | A1* | 3/2021 | Kroepfl | G01C 21/3841 |

OTHER PUBLICATIONS

Machine Translation: JP-7009399-B2 (year:2022).*

Behley et al., "Efficient Surfel-Based SLAM using 3D Laser Range Data in Urban Environments," Robotics: Science and Systems, 2018, 10 pages.

Park et al., "Probabilistic Surfel Fusion for Dense LiDAR Mapping," Proceedings of the IEEE International Conference on Computer Vision, 2017, pp. 2418-2426.

Pfister et al., "Surfels: surface elements as rendering primitives." Proceedings of the 27th annual conference on Computer graphics and interactive techniques, 2000, pp. 335-342.

Schops et al., "SurfelMeshing: Online Surfel-Based Mesh Reconstruction," CoRR, Oct. 2018, arxiv.org/abs/1810.00729v1, 13 pages.

Stuckler et al., "Efficient Mobile Robot Navigation using 3D Surfel Grid Maps," In Proc. of the German Conference on Robotics, May 2012, 5 pages.

Stuckler et al., "Multi-Resolution Surfel Maps for Efficient Dense 3D Modeling and Tracking," Journal of Visual Communication and Image Representation, Jan. 2014, 25(1):137-147.

Wang et al., "Real-time Scalable Dense Surfel Mapping," 2019 International Conference on Robotics and Automation, May 2019, pp. 6919-6925.

* cited by examiner

LOCALIZATION USING SURFEL DATA

BACKGROUND

This specification relates to automatic planning of autonomous vehicle driving decisions.

Autonomous vehicles include self-driving cars, boats, and aircraft. Autonomous vehicles use a variety of on-board sensors in tandem with map representations of the environment in order to make control and navigation decisions.

Some vehicles use a two-dimensional or a 2.5-dimensional map to represent characteristics of the operating environment. A two-dimensional map associates each location, e.g., as given by latitude and longitude, with some properties, e.g., whether the location is a road, or a building, or an obstacle. A 2.5-dimensional map additionally associates a single elevation with each location. However, such 2.5-dimensional maps are problematic for representing three-dimensional features of an operating environment that might in reality have multiple elevations. For example, overpasses, tunnels, trees, and lamp posts all have multiple meaningful elevations within a single latitude/longitude location on a map.

SUMMARY

This specification describes how a vehicle, e.g., an autonomous or semi-autonomous vehicle, can use an existing surfel map and new sensor data to determine a location of the vehicle in an environment. A system on-board the vehicle can obtain the surfel data, e.g., surfel data that has been generated by one or more vehicles navigating through the environment at respective previous time points, from a server system and the sensor data from one or more sensors on-board the vehicle. The system can then combine the surfel data and the sensor data to determine the location of the vehicle in the environment.

In particular, the system can identify multiple high-stability surfels in the surfel data, and use sensor measurements corresponding to the high-stability surfels to perform vehicle localization. The system need not treat the existing surfel data or the new sensor data as a ground-truth representation of the environment. Instead, the system can assign a particular level of uncertainty to both the surfel data and the sensor data, and combine them to generate a prediction of the location of the vehicle that is typically more accurate than predictions generated using either the surfel data or the sensor data in isolation.

Particular embodiments of the subject matter described in this specification can be implemented so as to realize one or more of the following advantages.

Some existing systems use a 2.5-dimensional system to represent an environment, which limits the representation to a single element having a particular altitude for each (latitude, longitude) coordinate in the environment. Using techniques described in this specification, a system can instead leverage a three-dimensional surfel map to make autonomous driving decisions. The three-dimensional surfel map allows multiple different elements at respective altitudes for each (latitude, longitude) coordinate in the environment, yielding a more accurate and flexible representation of the environment.

Some existing systems rely entirely on existing representations of the world, generated offline using sensor data generated at previous time points, to navigate through a particular environment. These systems can be unreliable, because the state of the environment might have changed since the representation was generated offline or since the environment was later observed. Some other existing systems rely entirely on sensor data generated by the vehicle at the current time point to navigate through a particular environment. These systems can be inefficient, because they fail to leverage existing knowledge about the environment that the vehicle or other vehicles have gathered at previous time points. Using techniques described in this specification, an on-board system can combine an existing surfel map and online sensor data to generate a prediction for the state of the environment. The existing surfel data allows the system to get a jump-start on the prediction and plan ahead for regions that are not yet in the range of the sensors of the vehicle, while the sensor data allows the system to be agile to changing conditions in the environment.

Using a surfel representation to combine the existing data and the new sensor data can be particularly efficient with respect to the time, memory, and processing power required. Using techniques described in this specification, a system can quickly integrate new sensor data with the data in the surfel map to generate a representation that is also a surfel map. This process is especially time- and memory-efficient because surfels require relatively little bookkeeping, as each surfel is an independent entity. Existing systems that rely, e.g., on a 3D mesh cannot integrate sensor data as seamlessly because if the system moves one particular vertex of the mesh, then the entire mesh is affected; different vertices might cross over each other, yielding a crinkled mesh that must be untangled. Updating the mesh can therefore be a lengthy and computationally expensive process.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

This specification describes how a vehicle, e.g., an autonomous or semi-autonomous vehicle, can use a surfel map to make autonomous driving decisions.

In this specification, a surfel is data that represents a two-dimensional surface that corresponds to a particular three-dimensional coordinate system in an environment. A surfel includes data representing a position and an orientation of the two-dimensional surface in the three-dimensional coordinate system. The position and orientation of a surfel can be defined by a corresponding set of coordinates. For example, a surfel can be defined by spatial coordinates, e.g., (x,y,z) defining a particular position in a three-dimensional coordinate system, and orientation coordinates, e.g., (pitch, yaw, roll) defining a particular orientation of the surface at the particular position. As another example, a surfel can be defined by spatial coordinates that define the particular position in a three-dimensional coordinate system and a normal vector, e.g., a vector with a magnitude of 1, that defines the orientation of the surface at the particular position. The location of a surfel can be represented in any appropriate coordinate system. In some implementations, a system can divide the environment being modeled to include volume elements (voxels) and generate at most one surfel for each voxel in the environment that includes a detected object. In some other implementations, a system can divide the environment being modeled into voxels, where each voxel can include multiple surfels; this can allow each voxel to represent complex surfaces more accurately.

A surfel can also optionally include size and shape parameters, although often all surfels in a surfel map have the same size and shape. A surfel can have any appropriate shape. For example, a surfel can be a square, a rectangle, an ellipsoid, or a two-dimensional disc, to name just a few examples.

In this specification, a surfel map is a collection of surfels that each correspond to a respective location in the same environment. The surfels in a surfel map collectively represent the surface detections of objects in the environment. In some implementations, each surfel in a surfel map can have additional data associated with it, e.g., one or more labels describing the surface or object characterized by the surfel. As a particular example, if a surfel map represents a portion of a city block, then each surfel in the surfel map can have a semantic label identifying the object that is being partially characterized by the surfel, e.g., "streetlight," "stop sign," "mailbox," etc.

A surfel map can characterize a real-world environment, e.g., a particular portion of a city block in the real world, or a simulated environment, e.g., a virtual intersection that is used to simulate autonomous driving decisions to train one or more machine learning models. As a particular example, a surfel map characterizing a real-world environment can be generated using sensor data that has been captured by sensors operating in the real-world environment, e.g., sensors on-board a vehicle navigating through the environment. In some implementations, an environment can be partitioned into multiple three-dimensional volumes, e.g., a three-dimensional grid of cubes of equal size, and a surfel map characterizing the environment can have at most one surfel corresponding to each volume.

After the surfel map has been generated, e.g., by combining sensor data gathered by multiple vehicles across multiple trips through the real-world, one or more systems on-board a vehicle can receive the generated surfel map. Then, when navigating through a location in the real world that is represented by the surfel map, the vehicle can process the surfel map along with real-time sensor measurements of the environment in order to make better driving decisions than if the vehicle were to rely on the real-time sensor measurements alone.

Figure 1:
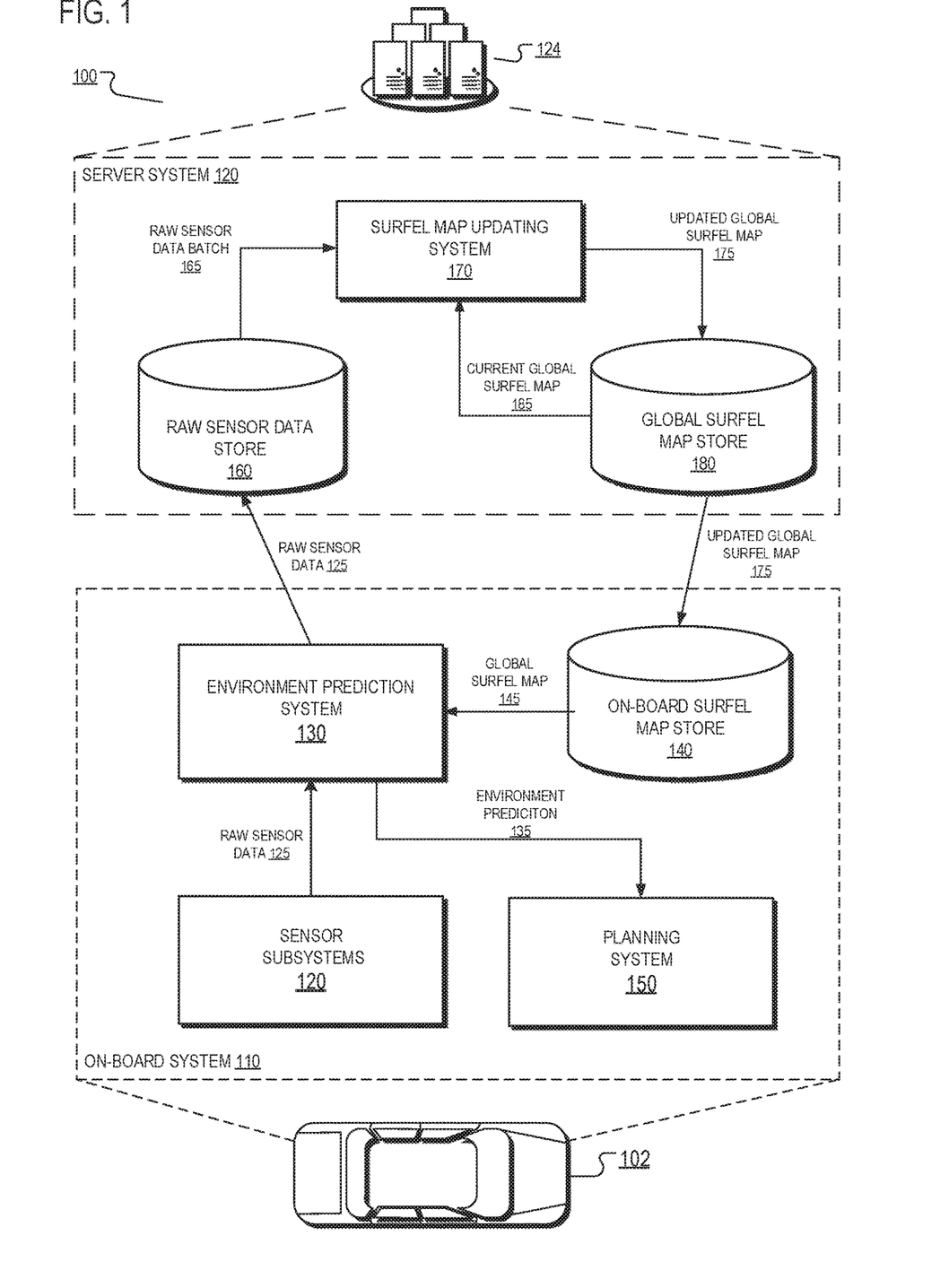
FIG. 1 is a diagram of an example system.

FIG. 1 is a diagram of an example system 100. The system 100 can include multiple vehicles, each with a respective on-board system. For simplicity, a single vehicle 102 and its on-board system 110 is depicted in FIG. 1. The system 100 also includes a server system 120 which every vehicle in the system 100 can access.

The vehicle 102 in FIG. 1 is illustrated as an automobile, but the on-board system 102 can be located on-board any appropriate vehicle type. The vehicle 102 can be a fully autonomous vehicle that determines and executes fully-autonomous driving decisions in order to navigate through an environment. The vehicle 102 can also be a semi-autonomous vehicle that uses predictions to aid a human driver. For example, the vehicle 102 can autonomously apply the brakes if a prediction indicates that a human driver is about to collide with an object in the environment, e.g., an object or another vehicle represented in a surfel map. The on-board system 110 includes one or more sensor subsystems 120. The sensor subsystems 120 include a combination of components that receive reflections of electromagnetic radiation, e.g., lidar systems that detect reflections of laser light, radar systems that detect reflections of radio waves, and camera systems that detect reflections of visible light.

The sensor data generated by a given sensor generally indicates a distance, a direction, and an intensity of reflected radiation. For example, a sensor can transmit one or more pulses of electromagnetic radiation in a particular direction and can measure the intensity of any reflections as well as the time that the reflection was received. A distance can be computed by determining how long it took between a pulse and its corresponding reflection. The sensor can continually sweep a particular space in angle, azimuth, or both. Sweeping in azimuth, for example, can allow a sensor to detect multiple objects along the same line of sight.

The sensor subsystems 120 or other components of the vehicle 102 can also classify groups of one or more raw sensor measurements from one or more sensors as being measures of an object of a particular type. A group of sensor measurements can be represented in any of a variety of ways, depending on the kinds of sensor measurements that are being captured. For example, each group of raw laser sensor measurements can be represented as a three-dimensional point cloud, with each point having an intensity and a position. In some implementations, the position is represented as a range and elevation pair. Each group of camera sensor measurements can be represented as an image patch, e.g., an RGB image patch.

Once the sensor subsystems 120 classify one or more groups of raw sensor measurements as being measures of a respective object of a particular type, the sensor subsystems 120 can compile the raw sensor measurements into a set of raw sensor data 125, and send the raw data 125 to an environment prediction system 130.

The on-board system 110 also includes an on-board surfel map store 140 that stores a global surfel map 145 of the real-world. The global surfel map 145 is an existing surfel map that has been generated by combining sensor data captured by multiple vehicles navigating through the real world.

Generally, every vehicle in the system 100 uses the same global surfel map 145. In some cases, different vehicles in the system 100 can use different global surfel maps 145, e.g., when some vehicles have not yet obtained an updated version of the global surfel map 145 from the server system 120.

Each surfel in the global surfel map 145 can have associated data that encodes multiple classes of semantic information for the surfel. For example, for each of the classes of semantic information, the surfel map can have one or more labels characterizing a prediction for the surfel corresponding to the class, where each label has a corresponding probability. As a particular example, each surfel can have multiple labels, with associated probabilities, predicting the type of the object characterized by the surfel, e.g., "pole" with probability 0.8, "street sign" with probability 0.15, and "fire hydrant" with probability 0.05.

The environment prediction system 130 can receive the global surfel map 145 and combine it with the raw sensor data 125 to generate an environment prediction 135. The environment prediction 135 includes data that characterizes a prediction for the current state of the environment, including predictions for an object or surface at one or more locations in the environment.

The raw sensor data 125 might show that the environment through which the vehicle 102 is navigating has changed. In some cases, the changes might be large and discontinuous, e.g., if a new building has been constructed or a road has been closed for construction since the last time the portion of the global surfel map 145 corresponding to the environment has been updated. In some other cases, the changes might be small and continuous, e.g., if a bush grew by an inch or a leaning pole increased its tilt. In either case, the raw sensor data 125 can capture these changes to the world, and the environment prediction system 130 can use the raw sensor data to update the data characterizing the environment stored in the global surfel map 145 to reflect these changes in the environment prediction 135.

For one or more objects represented in the global surfel map 145, the environment prediction system 130 can use the raw sensor data 125 to determine a probability that the object is currently in the environment. In some implementations, the environment prediction system 130 can use a Bayesian model to generate the predictions of which objects are currently in the environment, where the data in the global surfel map 145 is treated as a prior distribution for the state of the environment, and the raw sensor data 125 is an observation of the environment. The environment prediction system 130 can perform a Bayesian update to generate a posterior belief of the state of the environment, and include this posterior belief in the environment prediction 135. In some implementations, the raw sensor data 125 also has a probability distribution for each object detected by the sensor subsystem 120 describing a confidence that the object is in the environment at the corresponding location; in some other implementations, the raw sensor data 125 includes detected objects with no corresponding probability distribution.

For example, if the global surfel map 145 includes a representation of a particular object, and the raw sensor data 125 includes a strong detection of the particular object in the same location in the environment, then the environment prediction 135 can include a prediction that the object is in the location with high probability, e.g., 0.95 or 0.99. If the global surfel map 145 does not include the particular object, but the raw sensor data 125 includes a strong detection of the particular object in the environment, then the environment prediction 135 might include a weak prediction that the object is in the location indicated by the raw sensor data 125, e.g., predict that the object is at the location with probability of 0.5 or 0.6. If the global surfel map 145 does include the particular object, but the raw sensor data 125 does not include a detection of the object at the corresponding location, or includes only a weak detection of the object, then the environment prediction 135 might include a prediction that has moderate uncertainty, e.g., assigning a 0.7 or 0.8 probability that the object is present.

That is, the environment prediction system 130 might assign more confidence to the correctness of the global surfel map 145 than to the correctness of the raw sensor data 125. In some other implementations, the environment prediction system 130 might assign the same or more confidence to the correctness of the sensor data 125 than to the correctness of the global surfel map 145. In either case, the environment prediction system 130 does not treat the raw sensor data 125 or the global surfel map 145 as a ground-truth, but rather associates uncertainty with both in order to combine them. Approaching each input in a probabilistic manner can generate a more accurate environment prediction 135, as the raw sensor data 125 might have errors, e.g., if the sensors in the sensor subsystems 120 are miscalibrated, and the global surfel map 145 might have errors, e.g., if the state of the world has changed.

In some implementations, the environment prediction 135 can also include a prediction for each class of semantic information for each object in the environment. For example, the environment prediction system 130 can use a Bayesian model to update the associated data of each surfel in the global surfel map 145 using the raw sensor data 125 in order to generate a prediction for each semantic class and for each object in the environment. For each particular object represented in the global surfel map 145, the environment prediction system 130 can use the existing labels of semantic information of the surfels corresponding to the particular object as a prior distribution for the true labels for the particular object. The environment prediction system 130 can then update each prior using the raw sensor data 125 to generate posterior labels and associated probabilities for each class of semantic information for the particular object. In some such implementations, the raw sensor data 125 also has a probability distribution of labels for each semantic class for each object detected by the sensor subsystem 120; in some other such implementations, the raw sensor data 125 has a single label for each semantic class for each detected object.

Continuing the previous particular example, where a particular surfel characterizes a pole with probability 0.8, a street sign with probability 0.15, and fire hydrant with probability 0.05, if the sensor subsystems 120 detect a pole at the same location in the environment with high probability, then the Bayesian update performed by the environment prediction system 130 might generate new labels indicating that the object is a pole with probability 0.85, a street sign with probability 0.12, and fire hydrant with probability 0.03. The new labels and associated probabilities for the object are added to the environment prediction 135.

The environment prediction system 130 can provide the environment prediction 135 to a planning system 150 of the vehicle 102, which can use the environment prediction 130 to make autonomous driving decisions, e.g., generating a planned trajectory for the vehicle 102 through the environment.

The environment prediction system 130 can include a vehicle localization system that determines a location of the vehicle 102 in the environment. The vehicle localization system can determine the location using the raw sensor data 125 and the global surfel map 145. For example, the vehicle localization system can determine the location of the vehicle geometrically, i.e., by matching the three-dimensional structure of the sensor measurements in the raw sensor data 125 with the three-dimensional structure of the global surfel map 145. In some implementations, the global surfel map 145 includes semantic labels that identify, for each surfel in the global surfel map 145, whether the surface represented by the surface is stable, i.e., how likely the location of the surface is to change from time point to time point. In these implementations, the vehicle localization system in the environment prediction system 130 can weight the different sensor measurements in the raw sensor data 125 and the different surfels in the global surfel map 145 differently, by assigning a higher confidence to the sensor measurements and surfels corresponding to surfaces that are more stable and a lower confidence to sensor measurements and surfels that are less stable. After generating the prediction of the location of the vehicle 102 in the environment, the environment prediction system 130 can include the predicted location in the environment prediction 135, and send the location of the vehicle 102 to the planning subsystem 150 to use when making autonomous driving decisions.

The environment prediction system 130 can also provide the raw sensor data 125 to a raw sensor data store 160 located in the server system 120.

The server system 120 is typically hosted within a data center 124, which can be a distributed computing system having hundreds or thousands of computers in one or more locations.

The server system 120 includes a raw sensor data store 160 that stores raw sensor data generated by respective vehicles navigating through the real world. As each vehicle captures new sensor data characterizing locations in the real world, each vehicle can provide the sensor data to the server system 120. The server system 120 can then use the sensor data to update the global surfel map that every vehicle in the system 100 uses. That is, when a particular vehicle discovers that the real world has changed in some way, e.g., construction has started at a particular intersection or a street sign has been taken down, the vehicle can provide sensor data to the server system 120 so that the rest of the vehicles in the system 100 can be informed of the change.

The server system 120 also includes a global surfel map store 180 that maintains the current version of the global surfel map 185.

A surfel map updating system 170, also hosted in the server system 120, can obtain the current global surfel map 185 and a batch of raw sensor data 165 from the raw sensor data store 160 in order to generate an updated global surfel map 175. In some implementations, the surfel map updating system 170 updates the global surfel map at regular time intervals, e.g., once per hour or once per day, obtaining a batch of all of the raw sensor data 165 that has been added to the raw sensor data store 160 since the last update. In some other implementations, the surfel map updating system 170 updates the global surfel map whenever a new raw sensor data 125 is received by the raw sensor data store 160.

In some implementations, the surfel map updating system 170 generates the updated global surfel map 175 in a probabilistic way.

In some such implementations, for each measurement in the batch of raw sensor data 165, the surfel map updating system 170 can determine a surfel in the current global surfel map 185 corresponding to the location in the environment of the measurement, and combine the measurement with the determined surfel. For example, the surfel map updating system 170 can use a Bayesian model to update the associated data of a surfel using a new measurement, treating the associated data of the surfel in the current global surfel map 185 as a prior distribution. The surfel map updating system 170 can then update the prior using the measurement to generate posterior distribution for the corresponding location. This posterior distribution is then included in the associated data of the corresponding surfel in the updated global surfel map 175.

If there is not currently a surfel at the location of a new measurement, then the surfel map updating system 170 can generate a new surfel according to the measurement.

In some such implementations, the surfel map updating system 170 can also update each surfel in the current global surfel map 185 that did not have a corresponding new measurement in the batch of raw sensor data 165 to reflect a lower certainty that an object is at the location corresponding to the surfel. In some cases, e.g., if the batch of raw sensor data 165 indicates a high confidence that there is not an object at the corresponding location, the surfel map updating system 170 can remove the surfel from the updated global surfel map 175 altogether. In some other cases, e.g., when the current global surfel map 185 has a high confidence that the object characterized by the surfel is permanent and therefore that the lack of a measurement of the object in the batch of raw sensor data 165 might be an error, the surfel map updating system 170 might keep the surfel in the updated global surfel map 175 but decrease the confidence of the updated global surfel map 175 that an object is at the corresponding location.

After generating the updated global surfel map 175, the surfel map updating system 170 can store it in the global surfel map store 180, replacing the stale global surfel map 185. Each vehicle in the system 100 can then obtain the updated global surfel map 175 from the server system 120, e.g., through a wired or wireless connection, replacing the stale version with the retrieved updated global surfel map 175 in the on-board surfel map store 140. In some implementations, each vehicle in the system 100 retrieves an updated global surfel map 175 whenever the global surfel map is updated and the vehicle is connected to the server system 120 through a wired or wireless connection. In some other implementations, each vehicle in the system 100 retrieves the most recent updated global surfel map 175 at regular time intervals, e.g., once per day or once per hour.

Figure 2A:
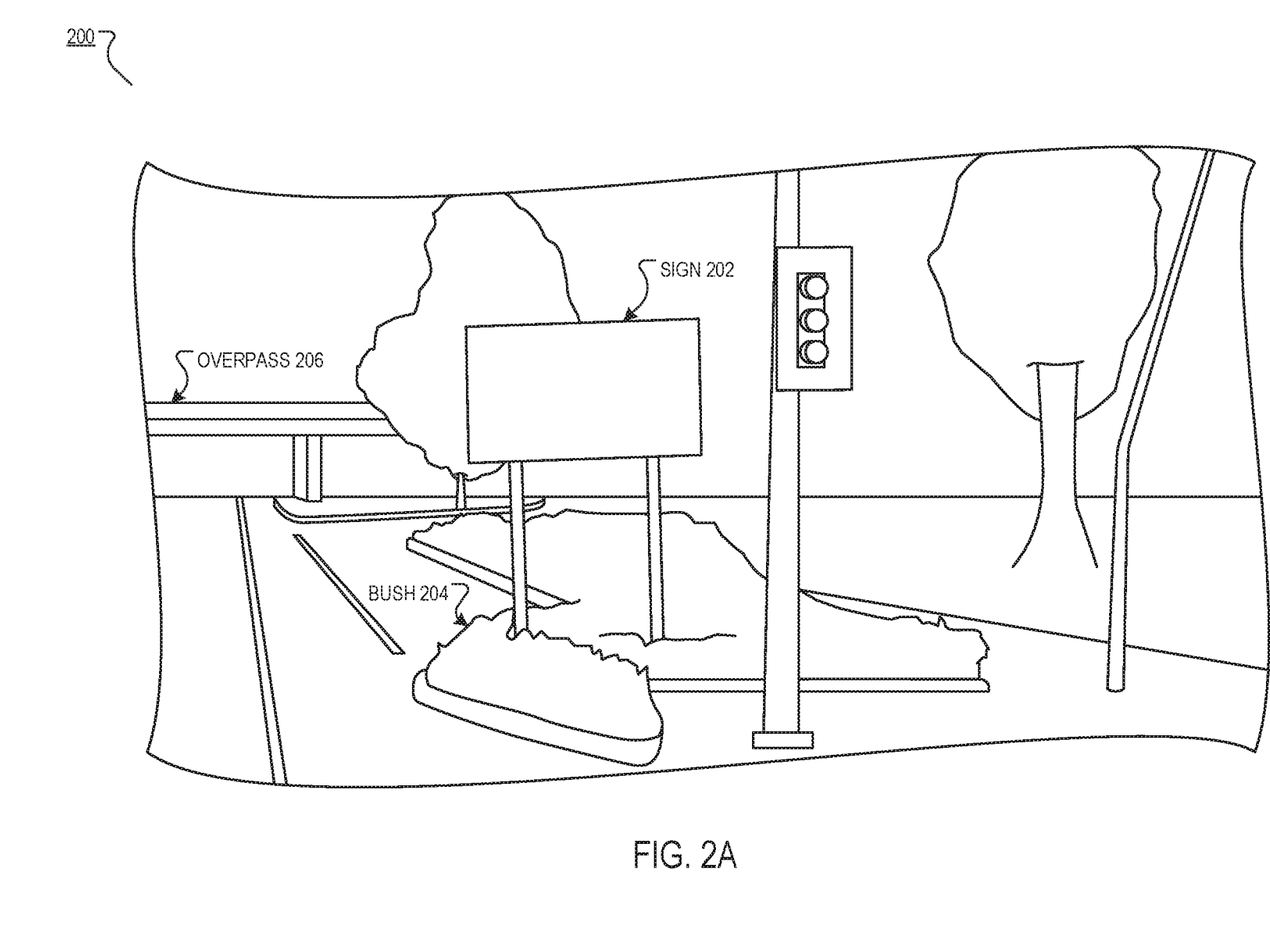
FIG. 2A is an illustration of an example environment.

FIG. 2A is an illustration of an example environment 200. The environment 200 is depicted from the point of view of a sensor on-board a vehicle navigating through the environment 200. The environment 200 includes a sign 202, a bush 204, and an overpass 206.

Figure 2B:
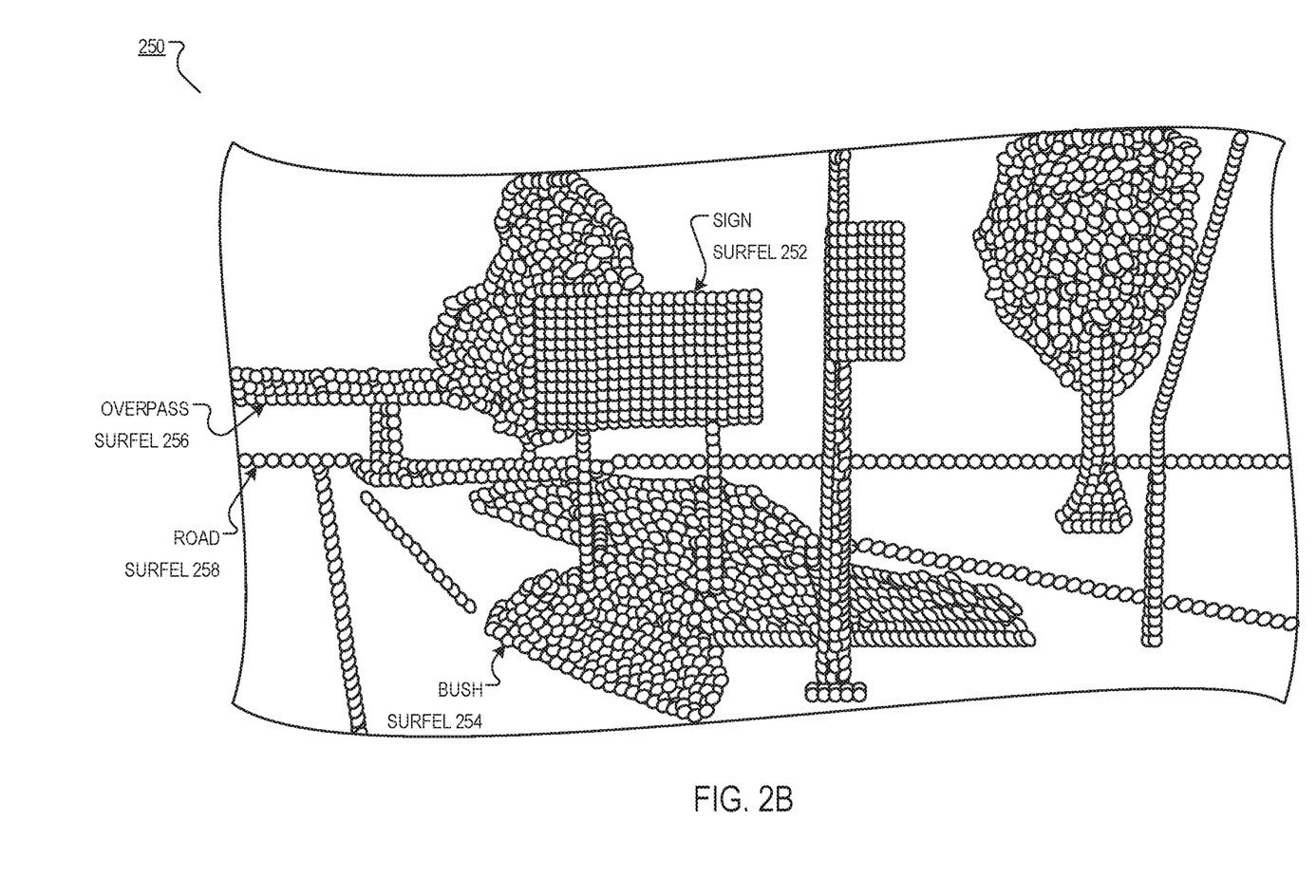
FIG. 2B is an illustration of an example surfel map of the environment of FIG. 2A.

FIG. 2B is an illustration of an example surfel map 250 of the environment 200 of FIG. 2A.

Each surfels in the surfel map 250 is represented by a disk, and defined by three coordinates (latitude, longitude, altitude), that identify a position of the surfel in a common coordinate system of the environment 200 and by a normal vector that identifies an orientation of the surfel. For example, each voxel can be defined to be the disk that extends some radius, e.g., 1, 10, 25, or 100 centimeters, around the (latitude, longitude, altitude) coordinate. In some other implementations, the surfels can be represented as other two-dimensional shapes, e.g., ellipsoids or squares.

The environment 200 is partitioned into a grid of equal-sized voxels. Each voxel in the grid of the environment 200 can contain at most one surfel, where, e.g., the (latitude, longitude, altitude) coordinate of each surfel defines the voxel that the surfel occupies. That is, if there is a surface of an object at the location in the environment corresponding to a voxel, then there can be a surfel characterizing the surface in the voxel; if there is not a surface of an object at the location, then the voxel is empty. In some other implementations, a single surfel map can contain surfels of various different sizes that are not organized within a fixed spatial grid.

Each surfel in the surfel map 250 has associated data characterizing semantic information for the surfel. For example, as discussed above, for each of multiple classes of semantic information, the surfel map can have one or more labels characterizing a prediction for the surfel corresponding to the class, where each label has a corresponding probability. As a particular example, each surfel can have multiple labels, with associated probabilities, predicting the type of the object characterized by the surfel. As another particular example, each surfel can have multiple labels, with associated probabilities, predicting the permanence of the object characterized by the surfel; for example, a "permanent" label might have a high associated probability for surfels characterizing buildings, while the "permanent" label might have a high probability for surfels characterizing vegetation. Other classes of semantic information can include a color, reflectivity, or opacity of the object characterized by the surfel.

For example, the surfel map 250 includes a sign surfel 252 that characterizes a portion of the surface of the sign 202 depicted in FIG. 2A. The sign surfel 252 might have labels predicted that the type of the object characterized by the sign surfel 252 is "sign" with probability 0.9 and "billboard" with probability 0.1. Because street signs are relatively permanent objects, the "permanent" label for the sign surfel 252 might be 0.95. The sign surfel 252 might have color labels predicting the color of the sign 202 to be "green" with probability 0.8 and "blue" with probability 0.2. Because the sign 202 is completely opaque and reflects some light, an opacity label of the sign surfel 252 might predict that the sign is "opaque" with probability 0.99 and a reflectivity label of the sign surfel 252 might predict that the sign is "reflective" with probability 0.6.

As another example, the surfel map 250 includes a bush surfel 254 that characterizes a portion of the bush 204 depicted in FIG. 2A. The bush surfel 254 might have labels predicted that the type of the object characterized by the bush surfel 254 is "bush" with probability 0.75 and "tree" with probability 0.25. Because bushes can grow, be trimmed, and die with relative frequency, the "permanent" label for the bush surfel 254 might be 0.2. The bush surfel 254 might have color labels predicting the color of the bush 204 to be "green" with probability 0.7 and "yellow" with probability 0.3. Because the bush 204 is not completely opaque and does not reflect a lot of light, an opacity label of the bush surfel 254 might predict that the sign is "opaque" with probability 0.7 and a reflectivity label of the sign surfel 252 might predict that the sign is "reflective" with probability 0.4.

Note that, for any latitude and longitude in the environment 200, i.e., for any given (latitude, longitude) position in a plane running parallel to the ground of the environment 200, the surfel map 250 can include multiple different surfels each corresponding to a different altitude in the environment 200, as defined by the altitude coordinate of the surfel. This represents a distinction between some existing techniques that are "2.5-dimensional," i.e., techniques that only allow a map to contain a single point at a particular altitude for any given latitude and longitude in a three-dimensional map of the environment. These existing techniques can sometimes fail when an environment has multiple objects at respective altitudes at the same latitude and longitude in the environment. For example, such existing techniques would be unable to capture both the overpass 206 in the environment 200 and the road underneath the overpass 205. The surfel map, on the other hand, is able to represent both the overpass 206 and the road underneath the overpass 206, e.g., with an overpass surfel 256 and a road surfel 258 that have the same latitude coordinate and longitude coordinate but a different altitude coordinate.

Figure 3:
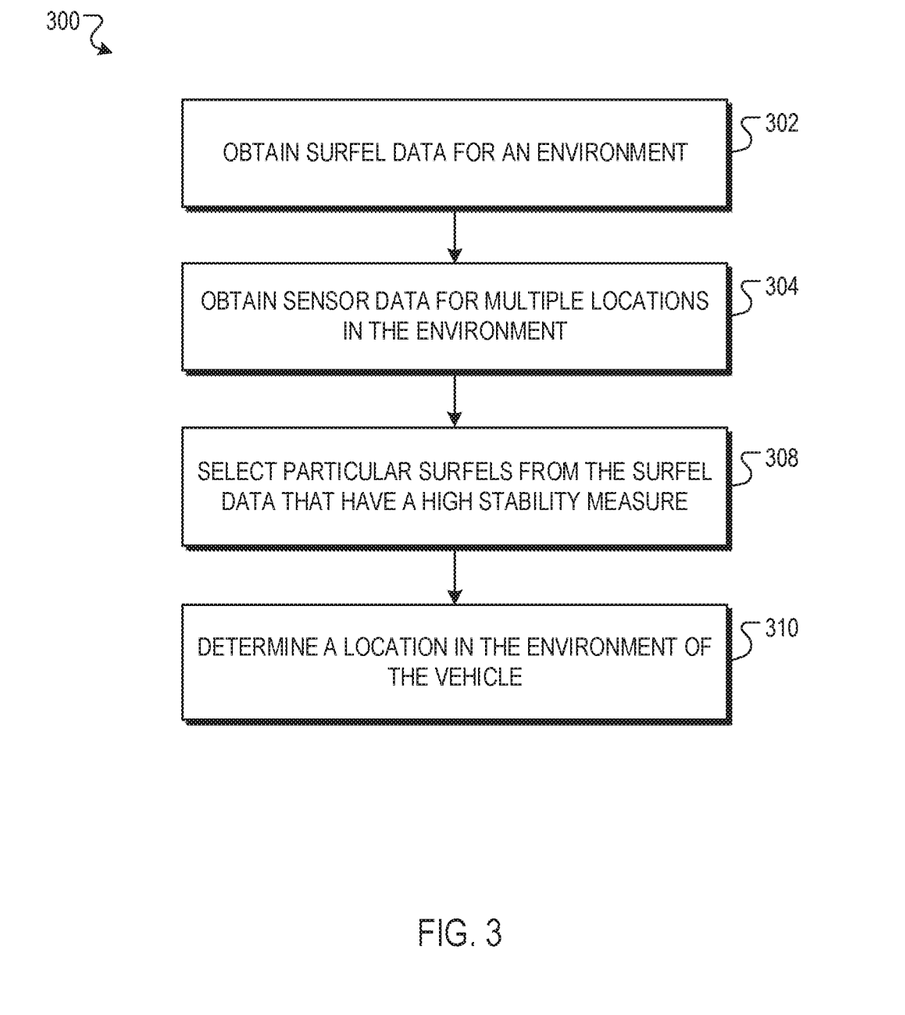
FIG. 3 is a flow diagram of an example process for determining a location of a vehicle in an environment.

FIG. 3 is a flow diagram of an example process 300 for determining a location of a vehicle in an environment. For convenience, the process 300 will be described as being performed by a system of one or more computers located in one or more locations. For example, a vehicle localization system, e.g., the vehicle localization system in the environment prediction system 150 depicted in FIG. 1, appropriately programmed in accordance with this specification, can perform the process 300.

The system obtains surfel data for an environment (step 302). The surfel data can include multiple surfels that each correspond to a respective different location in the environment. Each surfel in the surfel data can also have associated data. The associated data can include a stability measure that characterizes a permanence of the surface represented by the surfel. That is, the stability measure represents the extent to which the surface is likely to change locations in the environment from time point to time point, and in the extreme, the extent to which the surface will disappear from the environment altogether at a future time point. The stability measure corresponding to each surfel can be between a particular range of values, e.g., [0, 1] or [0, 100]. A higher stability measure indicates that the corresponding surface is more likely to be permanent at the location corresponding to the surfel, while a lower stability measure indicates that the corresponding surface is more likely to move to a different location in the environment or disappear from the environment.

As a particular example, a surfel which represents a surface of a building might have a high stability measure, e.g., 0.9, because the exterior of building generally do not change often, i.e., externally renovating, or demolishing, a buildings is relatively rare. A surfel which represents a surface of a hedge might have a low stability measure, e.g., 0.2, because hedges continuously grow, get blown around in windy conditions, and are often regularly trimmed to have a different surface location.

The associated data of each surfel can also include a respective class prediction for each of one or more other classes of semantic information for the surface represented by the surfel, e.g., object type, reflectivity, opacity, color, etc. In some implementations, the surfel data is represented using a voxel grid, where each surfel in the surfel data corresponds to a different voxel in the voxel grid.

The system obtains sensor data for one or more locations in the environment (step 304). The sensor data has been captured by one or more sensors of a vehicle navigating in the environment, e.g., the sensor subsystems 120 of the vehicle 102 depicted in FIG. 1.

In some implementations, the surfel data has been generated from data captured by one or more vehicles navigating through the environment at respective previous time points, e.g., the same vehicle that captured the sensor data and/or other vehicles.

The system identifies multiple particular surfels from the set of surfels in the obtained surfel data that have a high stability measure (step 308). The system determines particular high-stability surfels that have a high stability measure because high-stability surfels might be more reliable to use during localization than low-stability surfels that have a lower stability measure, indicating a lower permanence or a higher likelihood of the object represented by the surfel changing locations from time point to time point. For example, the system can determine one or more candidate surfels whose stability measure exceeds a particular threshold, e.g., 0.8 or 0.9. As another example, the system can rank each surfel in the surfel data according to stability measure, and determine the n surfels with the highest stability measure, e.g., 10 surfels or 100 surfels.

As another example, the system can rank each surfel in the surfel data according to stability measure and determine each surfel to be included in the group of particular surfels, assigning a rank to each particular surfel according to the stability measure. That is, every surfel is included in the particular surfels, with associated data identifying the stability measure or rank of each particular surfel.

The system determines a location in the environment of the first vehicle using the particular high-stability surfels and the sensor data (step 310). That is, the system can perform localization using the relative locations of the high-stability surfels and the relative locations of the sensor measurements in the sensor data.

For example, the system can combine the sensor measurements in the sensor data and the surfels in the surfel data geometrically. That is, the system can match the three-dimensional structure of the sensor measurements in the obtained sensor data with the three-dimensional structure of the surfels in the obtained surfel map.

As a particular example, the system can generate an initial alignment between the surfels in the surfel data and the sensor measurements in the sensor data. For example, the system can receive two images, where one image is generated from the sensor data and one image is generated from the surfel data, and compute scores for different x- and y-offsets between the two images using image convolution or correlation, e.g., using convolution implemented with Fast Fourier Transforms (FFT). The system can provide the initial alignment to a probabilistic Bayes filter that estimates the probability distribution of the position of the vehicle over time. As particular examples, the probabilistic filter can be a kalman filter, a particle filter, or a histogram filter. In some implementations, the system can further refine the estimated position of the vehicle using Iterative Closest Point (ICP). This process is described in U.S. application Ser. No. 16/229,370, the entire contents of which are hereby incorporated by reference.

In some implementations, the system combines only the high-stability surfels identified in step 308 with the sensor measurements when determining the location of the vehicle. That is, the system can discard the surfels in the surfel data that were not identified as high-stability.

In some other implementation, the system combines all of the surfels in the surfel data with the sensor measurements in the sensor data when determining the location of the vehicle, and weights the high-stability surfels determined in step 308 higher than other surfels in the surfel data. That is, the system can assign a weight to each surfel according to the stability of the surfel during geometric localization. For example, the system can assign a weight to a surfel equal to the stability measure of the surfel in the associated data of the surfel in the surfel data.

In some implementations, the system can determine a position of the vehicle, e.g., a (latitude, longitude, altitude) or (x, y, z) position, in a three-dimensional coordinate system of the environment and an orientation of the vehicle, e.g., a (pitch, yaw, roll) orientation, in the three-dimensional coordinate system of the environment. In some implementations, the system can relate the position and orientation of the vehicle to the roadgraph of the environment, e.g., projecting the position and orientation of the vehicle onto the roadgraph. For example, the system might process the computed position of the vehicle to determine whether the vehicle is centered in the lane of the vehicle.

As a particular example, the vehicle might be driving on a road that has a fence on one side of the road and a row of hedges on the other side of the road. The system might select high-stability surfels representing the fence, and not select low-stability surfels representing the hedges. The system can use the selected high-stability surfels in order to determine the position of the vehicle in a global three-dimensional coordinate system of the environment, or to determine the position of the vehicle relative to the center of the lane.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
    obtaining surfel data comprising a plurality of surfels, wherein:
        each surfel corresponds to a respective different location in an environment; and
        each surfel has associated data that comprises a stability measure, wherein the stability measure characterizes a permanence of a surface represented by the surfel;
    obtaining sensor data for a plurality of locations in the environment, the sensor data having been captured by one or more sensors of a first vehicle;
    determining a plurality of high-stability surfels from the plurality of surfels in the surfel data; and
    determining a location in the environment of the first vehicle using the plurality of selected high-stability surfels and the sensor data.

Embodiment 2 is the method of embodiment 1, wherein determining a location in the environment of the first vehicle using the plurality of selected high-stability surfels and the sensor data comprises:
    determining a respective weight for each high-stability surfel according to the stability measure of the high-stability surfel.
    determining the location in the environment of the first vehicle using geometric localization with the high-stability surfels, wherein each high-stability surfel is weighted by the corresponding determined weight.

Embodiment 3 is the method of any one of embodiments 1 or 2, wherein selecting one or more high-stability surfels from the plurality of candidate surfels comprises selecting one or more surfels that have a stability measure that is higher than a particular threshold.

Embodiment 4 is the method of any one of embodiments 1-3, wherein selecting one or more high-stability surfels from the plurality of candidate surfels comprises:

determining a ranking of the plurality of candidate surfels according to the respective stability measures of the candidate surfels; and selecting a plurality of surfels that have a highest ranking.

Embodiment 5 is the method of any one of embodiments 1-4, wherein selecting one or more high-stability surfels from the plurality of candidate surfels comprises:

determining a ranking of the plurality of candidate surfels according to the respective stability measures of the candidate surfels;

selecting each candidate surfel; and associated each candidate surfel with the corresponding stability measure.

Embodiment 6 is the method of any one of embodiments 1-5, wherein:

the method further comprises selecting a plurality of second particular surfels from the plurality of candidate surfels, wherein each second particular surfel has a lower stability measure; and determining a location in the environment of the first vehicle comprises discarding the plurality of second particular surfels.

Embodiment 7 is the method of any one of embodiments 1-6, wherein the surfel data has been generated from data captured by one or more second vehicles navigating in the environment at respective previous time points.

Embodiment 8 is the method of any one of embodiments 1-7, wherein the associated data of each surfel further comprises a respective class prediction for each of a plurality of classes of semantic information for the surface represented by the surfel.

Embodiment 9 is the method of embodiment 8, wherein the plurality of classes of semantic information comprise one or more of: an object class, a reflectivity, an opacity, or a color.

Embodiment 10 is the method of any one of embodiments 1-9, wherein each surfel in the surfel data comprises:

coordinates in a three-dimensional coordinate system of the environment that characterize a position of the surfel in the environment, and a normal vector that characterizes an orientation of the surfel in the environment.

Embodiment 11 is the method of any one of embodiments 1-10, wherein each surfel in the surfel data comprises:

coordinates in a three-dimensional coordinate system of the environment that characterize a position of the surfel in the environment, and coordinates in the three-dimensional coordinate system of the environment that characterize an orientation of the surfel in the environment.

Embodiment 12 is the method of any one of embodiments 1-11, wherein the surfel data comprises data characterizing a voxel grid, wherein each surfel in the surfel data corresponds to a different voxel in the voxel grid.

Embodiment 13 is a system comprising: one or more computers and one or more storage devices storing instructions that are operable, when executed by the one or more computers, to cause the one or more computers to perform the method of any one of embodiments 1 to 12.

Embodiment 14 is a computer storage medium encoded with a computer program, the program comprising instructions that are operable, when executed by data processing apparatus, to cause the data processing apparatus to perform the method of any one of embodiments 1 to 12.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method comprising:

obtaining preexisting surfel data comprising a plurality of surfels, wherein:

each surfel corresponds to a respective different location in an environment; and each surfel has associated data that comprises a stability measure, wherein the stability measure characterizes a permanence of a surface represented by the surfel;

obtaining sensor data for a plurality of locations in the environment, the sensor data having been captured by one or more sensors of a first vehicle while driving in the environment;

determining a plurality of surfels corresponding respectively to the plurality of locations in the sensor data obtained while driving in the environment;

selecting one or more high-stability surfels from the plurality of surfels in the preexisting surfel data corresponding to the sensor data obtained while driving in the environment, wherein the one or more high-stability surfels have a stability measure that is higher than a particular threshold;

determining a location in the environment of the first vehicle using the selected one or more high-stability surfels from the preexisting surfel data and the sensor data corresponding to the high-stability surfels obtained while driving in the environment; and providing the determined location in the environment of the first vehicle to a planning system, wherein the planning system makes one or more driving decisions based on the determined location in the environment of the first vehicle.

2. The method of claim 1, wherein the determining of a location in the environment of the first vehicle using the plurality of selected high-stability surfels and the sensor data comprises:
  determining a respective weight for each high-stability surfel according to the stability measure of the high-stability surfel; and
  determining the location in the environment of the first vehicle using geometric localization with the high-stability surfels, wherein each high-stability surfel is weighted by the corresponding determined weight.

3. The method of claim 1, wherein selecting one or more high-stability surfels from the plurality of candidate surfels comprises:
  determining a ranking of the plurality of candidate surfels according to the respective stability measures of the candidate surfels; and
  selecting a plurality of surfels that have a highest ranking.

4. The method of claim 1, wherein selecting one or more high-stability surfels from the plurality of candidate surfels comprises:
  determining a ranking of the plurality of candidate surfels according to the respective stability measures of the candidate surfels;
  selecting each candidate surfel; and
  associated each candidate surfel with the corresponding stability measure.

5. The method of claim 1, wherein:
  the method further comprises selecting a plurality of second particular surfels from the plurality of candidate surfels, wherein each second particular surfel has a lower stability measure; and
  the determining of a location in the environment of the first vehicle comprises discarding the plurality of second particular surfels.

6. The method of claim 1, wherein the surfel data has been generated from data captured by one or more second vehicles navigating in the environment at respective previous time points.

7. The method of claim 1, wherein the associated data of each surfel further comprises a respective class prediction for each of a plurality of classes of semantic information for the surface represented by the surfel.

8. The method of claim 7, wherein the plurality of classes of semantic information comprise one or more of: an object class, a reflectivity, an opacity, or a color.

9. The method of claim 1, wherein each surfel in the surfel data comprises:
  coordinates in a three-dimensional coordinate system of the environment that characterize a position of the surfel in the environment, and
  a normal vector that characterizes an orientation of the surfel in the environment.

10. The method of claim 1, wherein each surfel in the surfel data comprises:
  coordinates in a three-dimensional coordinate system of the environment that characterize a position of the surfel in the environment, and
  coordinates in the three-dimensional coordinate system of the environment that characterize an orientation of the surfel in the environment.

11. The method of claim 1, wherein the surfel data comprises data characterizing a voxel grid, wherein each surfel in the surfel data corresponds to a different voxel in the voxel grid.

12. A system comprising one or more computers and one or more storage devices storing instructions that are operable, when executed by the one or more computers, to cause the one or more computers to perform operations comprising:
  obtaining preexisting surfel data comprising a plurality of surfels, wherein:
    each surfel corresponds to a respective different location in an environment; and
    each surfel has associated data that comprises a stability measure, wherein the stability measure characterizes a permanence of a surface represented by the surfel;
  obtaining sensor data for a plurality of locations in the environment, the sensor data having been captured by one or more sensors of a first vehicle while driving in the environment;
  determining a plurality of surfels corresponding respectively to the plurality of locations in the sensor data obtained while driving in the environment;
  selecting one or more high-stability surfels from the plurality of surfels in the preexisting surfel data corresponding to the sensor data obtained while driving in the environment,
  wherein the one or more high-stability surfels have a stability measure that is higher than a particular threshold; and
  determining a location in the environment of the first vehicle using the selected one or more high-stability surfels from the preexisting surfel data and the sensor data corresponding to the high-stability surfels obtained while driving in the environment; and
  providing the determined location in the environment of the first vehicle to a planning system,
  wherein the planning system makes one or more driving decisions based on the location determined in the environment of the first vehicle.

13. The system of claim 12, wherein determining a location in the environment of the first vehicle using the plurality of selected high-stability surfels and the sensor data comprises:
  determining a respective weight for each high-stability surfel according to the stability measure of the high-stability surfel; and
  the determining of the location in the environment of the first vehicle comprises using geometric localization with the high-stability surfels, wherein each high-stability surfel is weighted by the corresponding determined weight.

14. The system of claim 12, wherein selecting one or more high-stability surfels from the plurality of candidate surfels comprises:
  determining a ranking of the plurality of candidate surfels according to the respective stability measures of the candidate surfels; and
  selecting a plurality of surfels that have a highest ranking.

15. One or more non-transitory computer storage media encoded with computer program instructions that when executed by a plurality of computers cause the plurality of computers to perform operations comprising:
  obtaining preexisting surfel data comprising a plurality of surfels, wherein:

each surfel corresponds to a respective different location in an environment; and each surfel has associated data that comprises a stability measure, wherein the stability measure characterizes a permanence of a surface represented by the surfel;

obtaining sensor data for a plurality of locations in the environment, the sensor data having been captured by one or more sensors of a first vehicle while driving in the environment;

determining a plurality of surfels corresponding respectively to the plurality of locations in the sensor data obtained while driving in the environment;

selecting one or more high-stability surfels from the plurality of surfels in the preexisting surfel data corresponding to the sensor data obtained while driving in the environment, wherein the one or more high-stability surfels have a stability measure that is higher than a particular threshold; and determining a location in the environment of the first vehicle using the selected one or more high-stability surfels from the preexisting surfel data and the sensor data corresponding to the high-stability surfels obtained while driving in the environment; and providing the determined location in the environment of the first vehicle to a planning system, wherein the planning system makes one or more driving decisions based on the determined location in the environment of the first vehicle.

16. The non-transitory computer storage media of claim 15, wherein determining a location in the environment of the first vehicle using the plurality of selected high-stability surfels and the sensor data comprises:

determining a respective weight for each high-stability surfel according to the stability measure of the high-stability surfel;

the determining of the location in the environment of the first vehicle comprises using geometric localization with the high-stability surfels, wherein each high-stability surfel is weighted by the corresponding determined weight.

17. The non-transitory computer storage media of claim 15, wherein selecting one or more high-stability surfels from the plurality of candidate surfels comprises:

determining a ranking of the plurality of candidate surfels according to the respective stability measures of the candidate surfels; and selecting a plurality of surfels that have a highest ranking.

* * * * *